Feb. 23, 1965    V. S. RITCHIE ETAL    3,170,324
AERODYNAMIC MEASURING DEVICE
Filed June 29, 1961    2 Sheets-Sheet 1

INVENTORS
VIRGIL S. RITCHIE
HOWARD F. OGDEN
BY
ATTORNEYS

Feb. 23, 1965    V. S. RITCHIE ETAL    3,170,324
AERODYNAMIC MEASURING DEVICE
Filed June 29, 1961    2 Sheets-Sheet 2

INVENTORS
VIRGIL S. RITCHIE
HOWARD F. OGDEN

BY

ATTORNEYS

United States Patent Office 3,170,324
Patented Feb. 23, 1965

3,170,324
AERODYNAMIC MEASURING DEVICE
Virgil S. Ritchie, Hampton, and Howard F. Ogden, Yorktown, Va., assignors to the United States of America as represented by the Administrator of the National Aeronautics and Space Administration
Filed June 29, 1961, Ser. No. 120,797
8 Claims. (Cl. 73—212)
(Granted under Title 35, U.S. Code (1952), sec. 266)

The invention described herein may be manufactured and used by or for the Government of the United States of America for governmental purposes without payment of any royalties thereon or therefor.

This application is a continuation-in-part of our co-pending application for Letters Patent, Serial Number 32,495, filed May 27, 1960, now abandoned.

This invention relates generally to a probe for sampling atmospheric pressures, and more particularly to a pressure probe for sensing ambient static air pressures.

Heretofore, various devices have been proposed for measuring the static atmospheric pressure acting upon an aircraft in flight. Such measurements are useful in determining a variety of navigational parameters, including altitude and air speed. Static pressure is conventionally sampled by mounting, on a forward portion of an aircraft, a probe which extends forwardly into a region in which the air is relatively undisturbed by the aircraft. The probe, which most commonly has a generally cylindrical shape and extends axially into the air flow, is provided with one or more orifices in the radial periphery thereof, and these orifices communicate through passageways or tubing with a pressure measuring device. However, for such an arrangement to accurately sense static pressure, it is necessary for the relative air flow to be in a direction parallel to the axis of the probe, since otherwise either ram or suction pressures may be introduced into the aforementioned orifices, depending on orifice location relative to the cross flow thus established.

Modern, high speed aircraft often assume rather extreme angles of yaw, pitch, and roll in performing a given mission. For this and other reasons, air flow direction and aircraft heading do not always coincide or remain in a constant relationship, and therefore it has long been recognized that errors in pressure measurement are encountered if a conventional probe is fixedly mounted on an aircraft.

Accordingly, a great deal of research has been directed towards the problem of in some way compensating for misalignment of a static pressure probe with the local air flow, and this research has produced numerous suggested devices for overcoming errors induced by cross flow. One such prior art device is a probe mounted for limited universal movement about the trailing end thereof, there being a system of four vanes thereon for aligning the probe axially with the airstream. A large number of orifices are formed in the circumference of the probe so as to sample pressure on all sides thereof. This probe, while it functions fairly well so long as only small angular misalignments exist between the aircraft and air flow, is unable to compensate for large changes of position in the pitch, yaw, and roll planes. Other suggested prior art devices incorporate complex electronic computing systems into the measuring circuit, and thus, at the expense of reduced system reliability and increased weight, compensate for cross flow errors.

Thus, the need continues to exist for a simple, rugged, reliable static pressure probe capable of accurately sensing static pressure regardless of probe position in, or alignment with, the local airstream.

Accordingly, it is an object of this invention to provide a new and useful atmospheric sampling device.

Another object of the present invention is the provision of a new and improved static pressure sampling probe.

A further object of the instant invention is to provide a new and improved static pressure sensing probe capable of operating over a wide range of Mach numbers.

A still further object of this invention is the provision of a new and improved static pressure measuring device which is insensitive to variations in attitude over a considerable range of angles of attack.

One still further object of the present invention is to provide a new and improved pressure sampling probe which is substantially insensitive to changes in alignment thereof with the airstream.

According to the present invention, the foregoing and other objects are attained by providing a generally cylindrical probe including a base portion affixed to an aircraft, or the like, and a leading portion extending axially from and rotatably mounted on the base portion, wherein the leading portion includes an aerodynamic surface affixed thereto on a peripheral portion thereof, and orifices formed in the periphery thereof at points equidistantly radially spaced from such surface by a sufficient distance to be maintained in a region where static pressure exists.

The foregoing and other objects, and many of the attendant advantages of this invention, will be readily apparent as the same becomes better understood by reference to the following detailed description when considered in connection with the accompanying drawings wherein:

FIG. 1 is a graphical representation of certain test results from pressure probe experiments;

FIGS. 2a, 2b, and 2d are schematic representations of a probe according to the present invention under varying flight conditions;

Reference is now invited to the drawings, wherein like reference numerals designate identical or correspondparts throughout the several views.

It can be shown experimentally that when a probe is placed at a given spatial position in an air mass, and when relative motion exists between the probe and the air, unless the probe extends in axial parallelism with the relative air flow, there will be established a cross flow striking the probe in a determinable direction. The point at which this cross flow acts on the probe along a line lying in a radial plane thereof is known as the stagnation point. If the probe is of cylindrical shape, there will exist, in an arcuate region extending approximately 37.5° around the circumference thereof on either side of the stagnation point, pressures greater than static pressure. Further, the remaining surface of the probe, or approximately 285° thereof, is subjected to less than static pressure. However, in small regions defining the boundary between the circumferential probe area subjected to pressure greater than static, and the area subjected to less than static pressure, it is found that static pressure exists.

These narrow regions lie approximately 37.5° to either side of the stagnation point, in the case of a cylindrical probe.

This phenomenon may be better understood by referring to typical test results. The results of one series of tests are illustrated graphically in FIG. 1. A cylindrical probe was placed in an airstream at a positive angle of attack, or pitch angle, of 12°. Orifices were provided at points 30°, 33°, 36°, 37.5° and 40° circumferentially on either side of the stagnation point, and pressure measurements were made individually at the respective orifice pairs, while the air flow Mach number was varied from 0.4 to 1.0. Additionally, orifices were spaced around the entire probe circumference at intervals of 30°, and the combined pressure sampled by these orifices was measured over the same range of Mach numbers. The following symbols are used in FIG. 1:

| Symbol | Meaning |
| --- | --- |
| P | Measured static pressure. |
| $P_x$ | Actual static pressure. |
| M | Mach number. |
|  | Pair of orifices located at $\theta$° on either side of stagnation point: |
| □ | $\theta=30°$ |
| ◇ | $\theta=33°$ |
| △ | $\theta=36°$ |
| ▽ | $\theta=37.5°$ |
| ▷ | $\theta=40°$ |
| ○ | Orifices at 30° intervals around entire probe circumference. |

Figure 1:
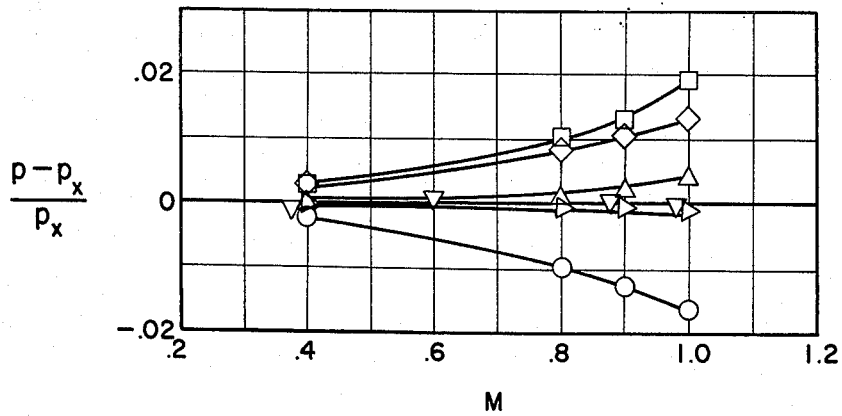

Thus it can be seen, by reference to FIG. 1, that nearly exact static pressure exists at the 37.5° stations, and that only small errors in pressure samplings exist at stations 36° and 40° circumferentially from the stagnation point. However, at the 30° and 33° stations, and even with orifices spaced at 30° intervals around the entire probe circumference, significant errors are detected. Thus, on either side of a narrowly defined region, accurate sampling of static pressure is not possible. For a cylindrical probe, this region lies approximately 37.5° to either side of the stagnation point, and may be defined generally by the range of 35° to 40°.

The relationships of orifice position to stagnation point set forth hereinbefore for cylindrical probes do not follow for other probe configurations. For a generally conical or ogive shaped probe, the ideal angle of separation of the orifices and stagnation point is greater than 37.5°, and increases as the fineness ratio decreases. For any given probe shape, the location of the region of static pressure subjection during periods of misalignment of the probe axis with the airstream may be calculated or determined experimentally.

In light of the foregoing discussion, it should now be readily apparent that if provision is made whereby the sampling orifices of a probe are maintained in the region where static pressure exists despite misalignment of the probe with the airstream, static pressure measurements can be made regardless of such misalignment. The present invention provides means for accomplishing such orifice positioning in a simple and reliable manner, now to be described.

Figure 2A:
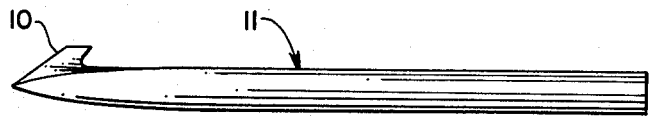
Figure 2B:
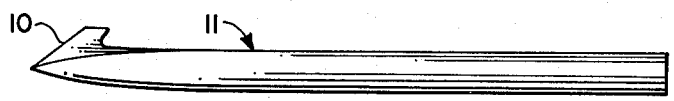
Figure 2C:
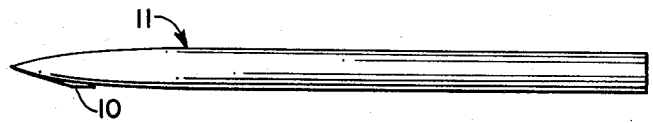
Figure 2D:
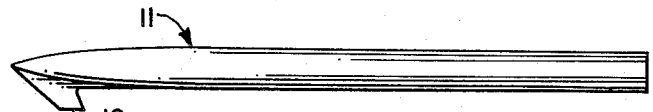

FIGS. 2a, 2b, 2c and 2d are artist's versions of Schlieren photographs of a probe, incorporating certain features of the present invention, undergoing tests at varying angles of attack and at a Mach number of 1.2. In the course of experimentation, one part of which was the test sequence illustrated in FIGS. 2a–2d, inclusive, it was found that if a vane or fin 10 was fixedly mounted on a probe 11 on a portion thereof which was free to rotate axially, the vane would tend to occupy a position directly opposite the cross flow stagnation point. This is so, since, with vane 10 so connected to probe 11 as to lie along a radial plane thereof, a differential pressure will develop on opposed faces of the vane unless the vane is directly opposite the stagnation point; and, therefore, the rotatable portion of probe 11 will be rotated by the vane until this condition of equilibrium exists. In FIG. 2a, probe 11 is at a positive angle of attack of 4°, and vane 10 extends nearly exactly vertically. In FIG. 2b, the angle of attack is again positive, but this time by only 1°, and vane 10 has rotated probe 11 slightly from the FIG. 2a position. In FIG. 2c, the angle of attack is 0°. Thus there is little or no cross flow, under ideal conditions, and the vane position is of little consequence. FIG. 2d shows probe 11 at a negative angle of attack of 1°, and the cross flow, now striking the probe generally from above, has caused the probe to rotate, under the influence of vane 10, until the vane occupies a position approximately opposite that shown in FIG. 2b.

It can be seen, therefore, that by mounting a probe so that a portion thereof can rotate axially, and by exteriorly attaching a vane to that portion and in a radial plane thereof, the rotatable portion of the probe can be caused to assume an angular position determined by cross flow. This knowledge, coupled with the phenomenon observed in the tests plotted in FIG. 1, indicates that static pressure could be reliably sampled by a probe carefully designed along the lines next to be set forth.

Figure 3:
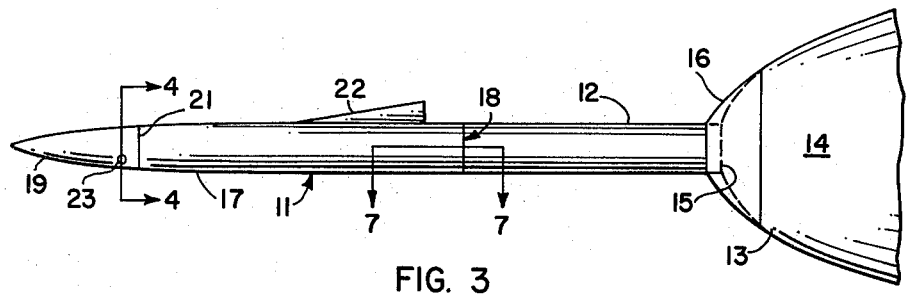
FIG. 3 is a side view of a probe according to the present invention axially affixed to a forward portion of an aircraft.
Figure 4:
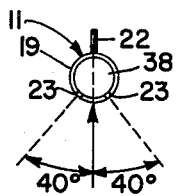
FIG. 4 is a sectional view taken along line 4—4 of FIG. 3.

FIGS. 3 and 4 illustrate a probe according to the present invention designed to take advantage of the experimental results hereinbefore discussed. As shown in FIG. 3, the probe, generally designated by reference numeral 11, comprises a rigid tubular base member 12, of generally cylindrical form, axially affixed at one end thereof to a forwardly projecting portion 13 of an aircraft 14, as by welding at edge 15. An annular jointure element 16 may be positioned about probe base member 12 for interconnecting the probe to the aircraft, thus providing additional strength. The other end of base member 12 is axially connected to one end of a rigid generally cylindrical tubular forward member 17, such connection being accomplished by means of a rotatable coupling means 18, more fully described hereinafter. Forward member 17 includes a generally conical or ogive shaped plug 19 at the forward end thereof, which may be joined thereto as by welding at juncture surface 21. A vane 22 is rigidly affixed to forward member 17 of probe 11, and lies along a radial plane thereof, as more clearly shown in FIG. 4.

Plug 19 is provided with a pair of pressure sampling orifices 23, which are on radial lines forming an angle of approximately 80° with one another, the angle being bisected by the radial plane of vane 22. These orifices communicate with a common passageway, not shown, which connects them to a pressure measuring instrument, as more fully described hereinafter. As hereinbefore mentioned, a cross flow striking ogive shaped plug 19 in the direction indicated by the arrow in FIG. 4 will create pressures higher than static pressure over about 80° of the circumference thereof. However, due to the configuration of plug 19, at points approximately 40° to either side of the stagnation point, static pressure will exist. It is at these points that orifices 23 are placed. If the cross flow should shift, due to a change in aircraft attitude, wind direction, or the like, vane 22 will cause forward member 17, and consequently plug 19, to rotate until the vane is again diametrically opposite the cross flow. Accordingly, since the plane of vane 22 bisects the angle formed by the radii on which orifices 23 lie, as shown in FIG. 4, the orifices will again be positioned approximately 40° from the stagnation point, as also illustrated in FIG. 4.

Figure 6:
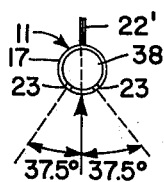
FIG. 6 is a sectional view taken along line 6—6 of FIG. 5.
Figure 5:
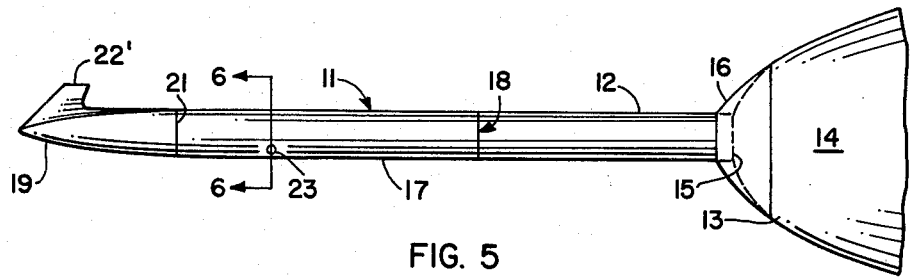
FIG. 5 is a side view of another embodiment of the probe according to the present invention.

The probe illustrated in FIGS. 3 and 4 has been found to function quite satisfactorily at subsonic, transonic, and low supersonic velocities. However, at high supersonic speeds, the probe illustrated in FIGS. 5 and 6 is preferred. As shown in FIG. 5, probe 11 may be mounted on an aircraft 14 at the edge 15 of forward portion 13 thereof. Annular support element 16 may interconnect base member 12 of probe 11 and aircraft 14, as shown, for additional jointure strength. General cylindrical forward member 17 of probe 11 is rotatably connected through coupling 18 to base member 12, and an ogive plug 19 may be mounted on end 21 of forward member 17 to serve as a closure element therefor. As thus far described, it will be noted that the probe of FIG. 5 is identical to that of FIGS. 3 and 4.

Vane 22' is fixedly mounted on plug 19 so as to lie along a radial plane thereof. As shown in FIG. 6, this plane bisects an angle of approximately 75° which is formed by the radii passing through orifices 23 formed in forward member 17. Thus, as a cross flow strikes probe 11 in the direction indicated by the arrow in FIG. 6, orifices 23 will be located approximately 37.5° circumferentially from the stagnation point. As hereinbefore discussed, static pressure exists in these regions on a cylindrical body despite cross flow. Should the direction of cross flow shift, vane 22' will cause forward member 17 of probe 11 to rotate until the relationship shown in FIG. 6 is re-established.

Figure 7:
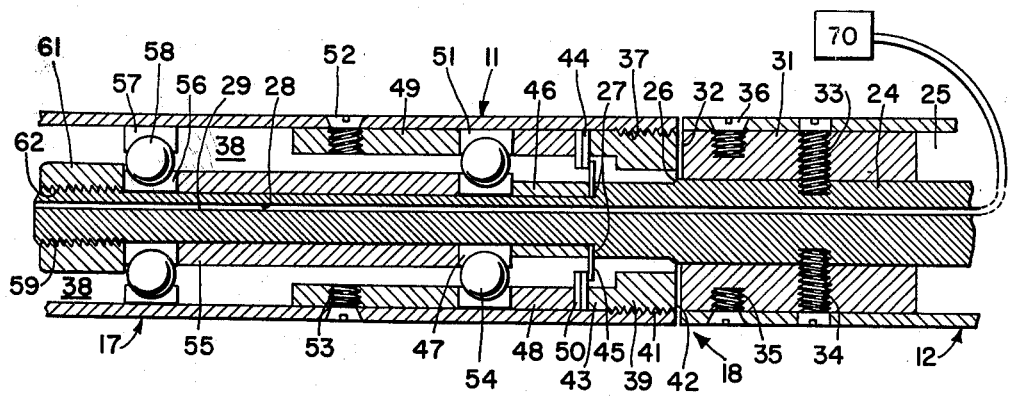
FIG. 7 is an enlarged sectional view taken along line 7—7 of FIG. 3, and illustrating certain of the elements which may form a part of the probes of either FIGS. 3 or 5.

FIG. 7 illustrates the details of a rotatable coupling 18, which may be utilized in either of the aforementioned embodiments of probe 11. While it is to be understood that equivalent mechanical elements may be utilized, it is preferred that the specific elements now to be described be incorporated into such probes.

As shown in FIG. 7, coupler 18 is formed about a cylindrical shaft 24 positioned axially within concavity 25 of tubular base member 12. Shaft 24 projects beyond the anterior end of member 12 in successively reduced diameter portions forming shoulders 26 and 27 thereon and constitutes an elongate support. A bore 28 is formed in shaft 24 and a tube 29 is positioned therein extending from the anterior end of shaft 24 to a pressure measuring and indicating means, 70 positioned within aircraft 14. An annular support 31 is disposed about shaft 24 within concavity 25 forming a planar end portion 32 with the anterior end of member 12. Aligned tap holes 33 are formed in member 12, support 31, and shaft 24 for reception of a screw 34 to secure the elements together, thereby providing structural strength and rigidity. Additional tap holes 35 are formed in member 12 and support 31, and a screw 36 is disposed in each tap hole threadedly securing the elements together for additional structural strength. Internal threads 37 are formed in the posterior end of member 17 within concavity 38. An annular member 39 having external threads 41 formed therein is threadedly secured to member 17 forming a planar end portion 42 with the posterior end thereof juxtapositional from planar end portion 32. An annular projection 43 integrally formed on member 39 extends inwardly along the surface of concavity 38. A flexible annular washer 44, preferably formed of Teflon, or the equivalent, is positioned within concavity 38 touching the surface edge thereof and abutting on one side member 43. A rigid discoidal washer 45 is positioned about shaft 24 abutting shoulder 27 of shaft 24 and washer 44, thereby forming a low friction rotatable seal capable of retaining pressures greater than surrounding pressures within concavity 38. A rigid annular washer 50 formed of the same material as washer 45 is preferably provided to back-up washer 44. A tubular sleeve 46 is positioned about shaft 24 abutting on one end washer 45 and on the other end a ball bearing journal 47. Tubular spacers 48 and 49 are disposed within concavity 38 on either side of ball bearing cage 51; spacer 49 being secured to member 17 by a retaining screw 52 seated within aligned tap holes 53 formed in member 17 and spacer 49. Bearings 54 are disposed between journal 47 and cage 51. A tubular spacer 55 is placed around shaft 24 between ball bearing journals 47 and 56. A ball bearing cage 57 is positioned within concavity 38 around the surface edge thereof opposite journal 56 and bearings 58 are disposed therebetween. External threads 59 are formed in the anterior end of shaft 24 and an annular member 61 having internal threads 62 is threadedly secured thereto; the posterior side of member 61 abutting the anterior side of journal 56.

As the pressure sampled by orifices 23 (which communicate with concavity 38 at a point forward of the portion of member 17 shown in FIG. 7) varies, the pressure within concavity 38 will vary accordingly, and the measuring instrument, 70, which communicates with concavity 38 through bore 28 and tubular element 29, will indicate the correct static pressure.

In operation, vane 22 or 22' maintains orifices 23 in proper position for sampling static pressures regardless of probe alignment with the air flow. Thus, concavity 38 is subjected to static pressure; and, since this concavity is sealed at one end by plug 19 and at the other end by the rotatable seal formed by washers 44, 45 and 50, static pressure is transmitted through bore 28 and tube 29 to the measuring instrument.

It is to be noted that the measuring instrument may be a simple indicator or a conventional recording, telemetering or control device, or combination of such devices. As a specific example of the size of probe 11, a probe having an over-all diameter of one inch has been found to function quite well. In such a probe, shaft 24 may have a diameter of one-half inch at its posterior end and three-eighths of an inch at the anterior end thereof. The various other parts may be dimensioned accordingly.

The positioning, configuration, and size of vanes 22 or 22' are not considered to be particularly critical, with the exceptions next to be noted. It is quite desirable that the vanes be kept as small as practical and that the vane location be well removed axially from the orifices 23, since each of these criteria will reduce the amount of flow disturbance in the orifice area. Further, as hereinbefore mentioned, it is preferable that the vane be positioned forwardly, as shown in FIG. 5, for high supersonic speeds.

Obviously, many modifications and variations of the present invention will occur readily to those skilled in the art, in light of the foregoing teachings. It is therefore to be understood that within the scope of the appended claims, the invention may be practiced otherwise than as specifically described.

What is claimed as new and desired to be secured by Letters Patent of the United States is:

1. A static pressure probe comprising, a base member, a tubular forward member having a circular cross section, means rotatably mounting said forward member on said base member, said forward member having a pair of sampling orifices formed in the periphery thereof, said orifices being formed on radii of said forward member which form an angle of from 70° to 80°, inclusive, with one another, a vane exteriorly affixed to said forward member and lying in a plane substantially bisecting said radial angle, a static pressure measuring device, and means for providing communication between said orifices and said measuring devices.

2. The static pressure probe according to claim 1, wherein the angle formed by said radii is approximately 75°.

3. The static pressure probe according to claim 1, wherein the angle formed by said radii is approximately 80°.

4. A static pressure probe comprising, a base member, a tubular, generally cylindrical forward member having a longitudinal axis, means rotatably mounting said forward member on said base member for rotation about said longitudinal axis, said forward member having a pair of sampling orifices formed in the cylindrical periphery thereof at points intersected by respective radii of said cylindrical forward member forming an angle of approximately 75° with one another, a vane connected to said forward member and extending radially therefrom in a plane substantially bisecting said angle, and means for providing communication between said orifices and a static pressure measuring device.

5. The static pressure probe according to claim 4, further comprising seal means including a rigid annular washer mounted on the interior wall of said forward member, a flexible annular washer mounted on the interior wall of said forward member in contiguous relationship to said rigid annular washer, and a rigid discoidal element mounted on said base member and juxtaposed to said flexible annular washer.

6. The pressure probe according to claim 4 wherein said communication providing means includes a bore formed in said base member, and a tube disposed within said bore.

7. A device for sensing static pressure in an air stream, comprising: a base; an annular forward member; means for rotably mounting said forward member on said base; means forming orifices in the periphery of said forward member; means responsive to air stream direction relative to said forward member for rotating said forward member on said base to a position in which each of said orifices is in a region where substantially static pressure exists; and means for providing communication between said orifices and a static pressure measuring device.

8. The device as described in claim 7, further including seal means comprising a rigid annular washer mounted on the interior wall of said annular forward member; a flexible annular washer mounted on the interior wall of said annular forward member in contiguous relationship to said rigid annular washer; and a rigid discoidal element mounted on said base and juxtaposed to said flexible annular washer.

References Cited by the Examiner
UNITED STATES PATENTS

| | | | |
|---|---|---|---|
| 2,447,224 | 8/48 | Akerman | 73—188 |
| 2,524,747 | 10/50 | Ayres et al. | 73—182 |
| 2,554,634 | 5/51 | Paine et al. | 73—212 |
| 2,662,402 | 12/53 | Ince et al. | 73—212 |
| 2,705,890 | 4/55 | Klose | 73—189 |
| 2,791,905 | 5/57 | Cheney | 73—188 |
| 2,846,878 | 8/58 | Carbonara | 73—212 |
| 2,936,617 | 5/60 | Beebe | 73—178 |
| 2,977,793 | 4/61 | Bucalo | 73—212 |
| 3,120,123 | 2/64 | Werner et al. | 73—182 |

OTHER REFERENCES

Ritchie, U.S.: "Several Methods for Aerodynamic Reduction of Static-Pressure Sensing Errors for Aircraft at Subsonic, Near-Sonic, and Low Supersonic Speeds"; National Aeronautics and Space Administration Technical Report R–18; 1959.

RICHARD C. QUEISSER, *Primary Examiner.*

C. A. CUTTING, *Examiner.*